(12) United States Patent
Schierschmidt et al.

(10) Patent No.: US 9,694,862 B2
(45) Date of Patent: Jul. 4, 2017

(54) WORK VEHICLE

(71) Applicant: KOMATSU LTD., Tokyo (JP)

(72) Inventors: William Schierschmidt, Chattanooga, TN (US); Masaru Kurita, Chattanooga, TN (US)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/631,122

(22) Filed: Feb. 25, 2015

(65) Prior Publication Data

US 2016/0244111 A1 Aug. 25, 2016

(51) Int. Cl.
*B62D 55/15* (2006.01)
*B62D 55/14* (2006.01)
*B62D 55/06* (2006.01)

(52) U.S. Cl.
CPC ............. *B62D 55/15* (2013.01); *B62D 55/06* (2013.01); *B62D 55/14* (2013.01)

(58) Field of Classification Search
CPC ......... B62D 55/15; B62D 55/06; B62D 55/14
USPC ........ 180/9.1, 9.54; 305/120, 124, 125, 127, 305/128, 129, 130, 131, 132, 133, 134, 305/142
See application file for complete search history.

(56) References Cited

U.S. PATENT DOCUMENTS

| | | | | |
|---|---|---|---|---|
| 2,926,969 A * | 3/1960 | Ashley, Jr. | ............. | B62D 55/30 180/9.52 |
| 5,803,558 A * | 9/1998 | Ketting | ................ | B62D 55/088 305/119 |
| 6,422,664 B1 * | 7/2002 | Hasselbusch | .......... | B62D 55/15 305/135 |
| 6,435,292 B2 * | 8/2002 | Lemke | ................... | B62D 55/24 180/9.62 |
| 6,435,628 B1 * | 8/2002 | Hasselbusch | ...... | B62D 55/0847 305/109 |
| 6,481,807 B1 * | 11/2002 | Barani | ................... | B62D 55/08 305/100 |
| 6,607,256 B2 * | 8/2003 | Yoshida | ................. | B62D 55/14 305/132 |
| 6,679,570 B2 | 1/2004 | Kamikawa | | |
| 7,108,337 B2 * | 9/2006 | Yamamoto | ............. | B62D 55/15 305/129 |
| 8,469,465 B2 | 6/2013 | Wodrich | | |

(Continued)

*Primary Examiner* — Jacob Knutson
(74) *Attorney, Agent, or Firm* — Global IP Counselors, LLP

(57) ABSTRACT

A work vehicle comprises a vehicle body, a work implement, a track frame, a sprocket, an idler, a plurality of small track rollers, and first and second large track rollers. The track frame comprises opposite first and second end sections, and opposite upper and lower sections. The sprocket and idler are rotatably mounted to the first and second end sections, respectively, to movably support an endless track. The small and large track rollers are rotatably mounted to the lower section between the sprocket and idler and are unmovable in vertical and horizontal directions of the track frame. The small track rollers are all disposed between the first and second large track rollers. Each small track roller defines a respective small track rolling surface having a respective first tread diameter and each large track roller defines a respective large track rolling surface having a respective second tread diameter greater than each respective first tread diameter.

18 Claims, 12 Drawing Sheets

(56) References Cited

U.S. PATENT DOCUMENTS

| | | | | |
|---|---|---|---|---|
| 2010/0244554 A1* | 9/2010 | Yoshida | ............... | B62D 55/104 |
| | | | | 305/132 |
| 2011/0309672 A1* | 12/2011 | Thorson | ............... | B62D 55/092 |
| | | | | 305/138 |
| 2012/0274129 A1* | 11/2012 | Wodrich | ............ | B62D 55/1086 |
| | | | | 305/132 |
| 2013/0187444 A1* | 7/2013 | Hansen | .................. | B62D 55/04 |
| | | | | 305/142 |
| 2013/0221738 A1* | 8/2013 | Boivin | ................... | B62D 55/12 |
| | | | | 305/20 |

* cited by examiner

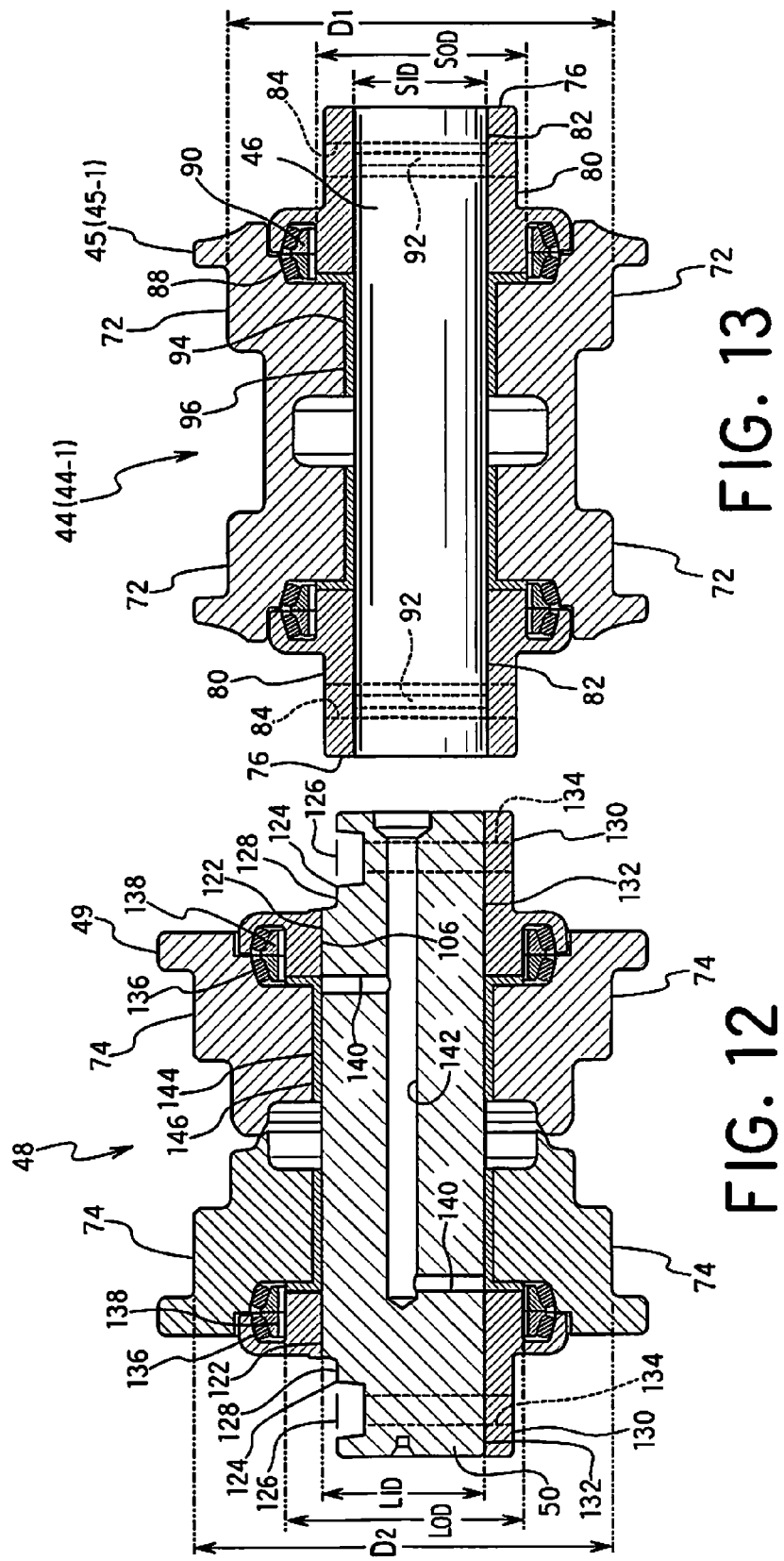

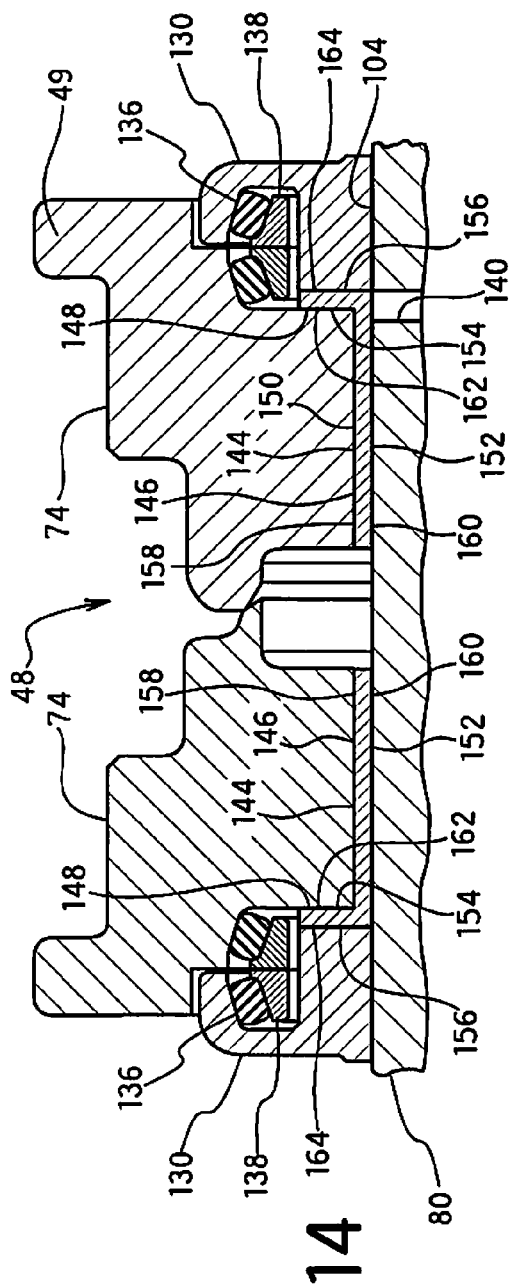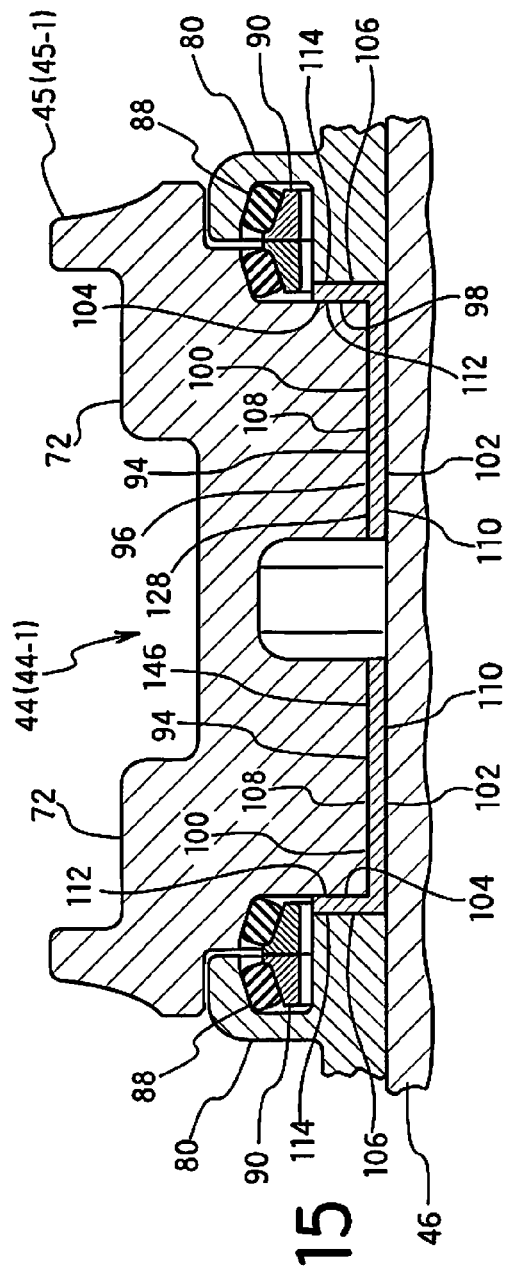

ically relates to a work vehicle.
WORK VEHICLE

BACKGROUND

Field of the Invention

The present invention generally relates to a work vehicle. More specifically, the present invention relates to a work vehicle traveling apparatus having a pair of tracks supported by a plurality of track rollers having different diameters.

Background Information

A work vehicle is a large machine that is used in construction, mining, forestry, farming, etc. Some of these work vehicles are provided with a traveling apparatus having a pair of tracks. Work vehicles having tracks are often called a track-type vehicle. Examples of track-type vehicles include a feller buncher, a hydraulic excavator, a bulldozer, and so on. A conventional track of a track-type vehicle typically has endlessly-coupled track links with track shoes mounted on the track links. The track is passed around a sprocket and an idler which are supported on the vehicle frame and disposed with a required spacing. The track links engage the sprocket of the drive wheel for driving the track. The track is supported by supported by a plurality of track rollers and a plurality of carrier rollers disposed between the sprocket and the idler in the vehicle frame. The track-type work vehicle travels by rotation of the sprocket of the drive wheel, which in turn drives the tracks. Two examples of track-type vehicles are disclosed in U.S. Pat. No. 6,679,570 and U.S. Pat. No. 8,469,465.

SUMMARY

It has been discovered that the frontmost and rearmost track rollers tend to wear out faster than the intermediate rollers.

Therefore, one object of the present invention is to provide a work vehicle traveling apparatus which improves the durability of the frontmost and rearmost track rollers.

In view of the state of the known technology and in accordance with a first aspect of the present disclosure, a work vehicle is basically provided that comprises a vehicle body, a work implement, a track frame, a sprocket, an idler, a plurality of small track rollers, and first and second large track rollers. The track frame comprises a first end section, a second end section opposite the first end section, an upper section and a lower section opposite the upper section. The sprocket is rotatably mounted to the first end section of the track frame. The idler is rotatably mounted to the second end section of the track frame, with the sprocket and the idler being configured to movably support an endless track that passes about the sprocket and the idler. The plurality of small track rollers are configured to guide the endless track, and are each rotatably mounted to the lower section of the track frame between the sprocket and the idler by a respective small track roller support shaft that is fixedly mounted to the track frame, such that the small track rollers are unmovable in vertical and horizontal directions with respect to the track frame. The first and second large track rollers are configured to guide the endless track, and are each rotatably mounted to the lower section of the track frame between the sprocket and the idler by a respective large track roller support shaft that is fixedly mounted to the track frame, such that the first and second large track rollers are unmovable in the vertical and horizontal directions with respect to the track frame with all of the small track rollers being disposed between the first and second large track rollers. Each of the small track rollers defines a respective small track rolling surface having a respective first tread diameter and each of the large track rollers defining a respective large track rolling surface having a respective second tread diameter that is greater than the respective first tread diameter of each of the small track rollers.

Also other objects, features, aspects and advantages of the disclosed work vehicle will become apparent to those skilled in the work vehicle field from the following detailed description, which, taken in conjunction with the annexed drawings, discloses one embodiment of the work vehicle.

BRIEF DESCRIPTION OF THE DRAWINGS

Referring now to the attached drawings which form a part of this original disclosure:

FIG. 12 is a cross sectional view of the frontmost track roller of the left track of the work vehicle traveling apparatus illustrated in FIG. 2 as seen along a vertical diameter section line;

FIG. 13 is a cross sectional view of the second track roller from the front of the left track of the work vehicle traveling apparatus illustrated in FIG. 2 as seen along a vertical diameter section line;

FIG. 14 is a detailed cross sectional view of the frontmost track roller of the left track of the work vehicle traveling apparatus as shown in FIG. 12; and FIG. 15 is a detailed cross sectional view of the second track roller from the front of the left track of the work vehicle traveling apparatus as shown in FIG. 13.

DETAILED DESCRIPTION OF THE EMBODIMENTS

Selected embodiments of the present invention will now be explained with reference to the drawings. It will be apparent to those skilled in the work vehicle field from this disclosure that the following descriptions of the embodiments of the present invention are provided for illustration only and not for the purpose of limiting the invention as defined by the appended claims and their equivalents.

Figure 1:
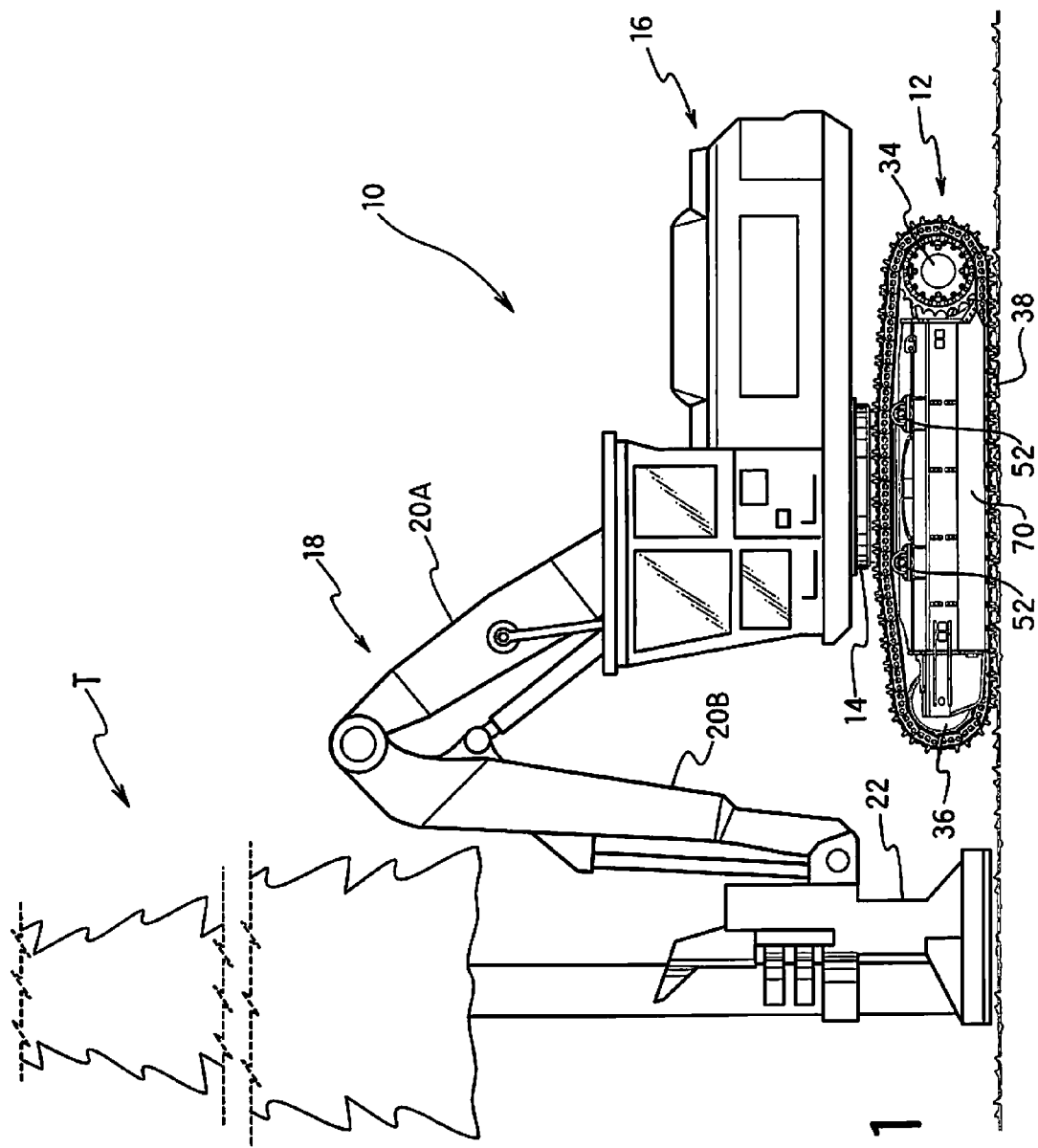
FIG. 1 is a side elevational view of a work vehicle in accordance with a first embodiment.

FIG. 1 illustrates an example of a work vehicle 10 that includes a traveling apparatus 12 according to a disclosed embodiment. As illustrated, the work vehicle 10 in this example further includes a pivotal attachment structure 14, a vehicle body 16 and a work implement 18. The vehicle body 16 is supported by and attached to the traveling apparatus 12 via the pivotal attachment structure 14. The work implement 18 is movably attached to the vehicle body 16.

In this example, the work vehicle 10 is a feller buncher. Therefore, the work implement 18 includes a boom 20A, an arm 20B and a feller head 22. The work implement 18 has the boom 20A movably attached to the vehicle body 16 and the arm 20B pivotally coupled to the boom 20A in any conventional manner. The feller head 22 is coupled to the arm 20B in a conventional manner. FIG. 1 illustrates the feller head 22 in a state of holding a tree T after the tree T has been cut down. Although the work vehicle 10 illustrated in this example is a feller buncher, the embodiments discussed herein are applicable to any type of moveable vehicle. Also, since the components of the vehicle body 16 and the work implement 18 are conventional components that are well known in the work vehicle field, these components will not be discussed or illustrated in detail herein, except as related to the disclosed embodiments.

Further details of the traveling apparatus 12 according to a disclosed embodiment will now be described. As used herein, directional terms such as "forward," "rearward," "above," "below," "downward," "upward," "vertical," "horizontal," "left," "right" and "transverse," as well as any other similar directional terms refer to those directions of a work vehicle on a level surface. Accordingly, these terms, as used to describe the disclosed embodiments, should be interpreted relative to a work vehicle equipped with any of the disclosed embodiments. The terms of degree such as "substantially," "about" and "approximately" as used herein mean an amount of deviation of the modified term such that the end result is not significantly changed. It is also noted that unless otherwise specified, all of the components discussed herein can be made of metal, steel, stainless steel or any other suitable material as understood in the art.

Figure 2:
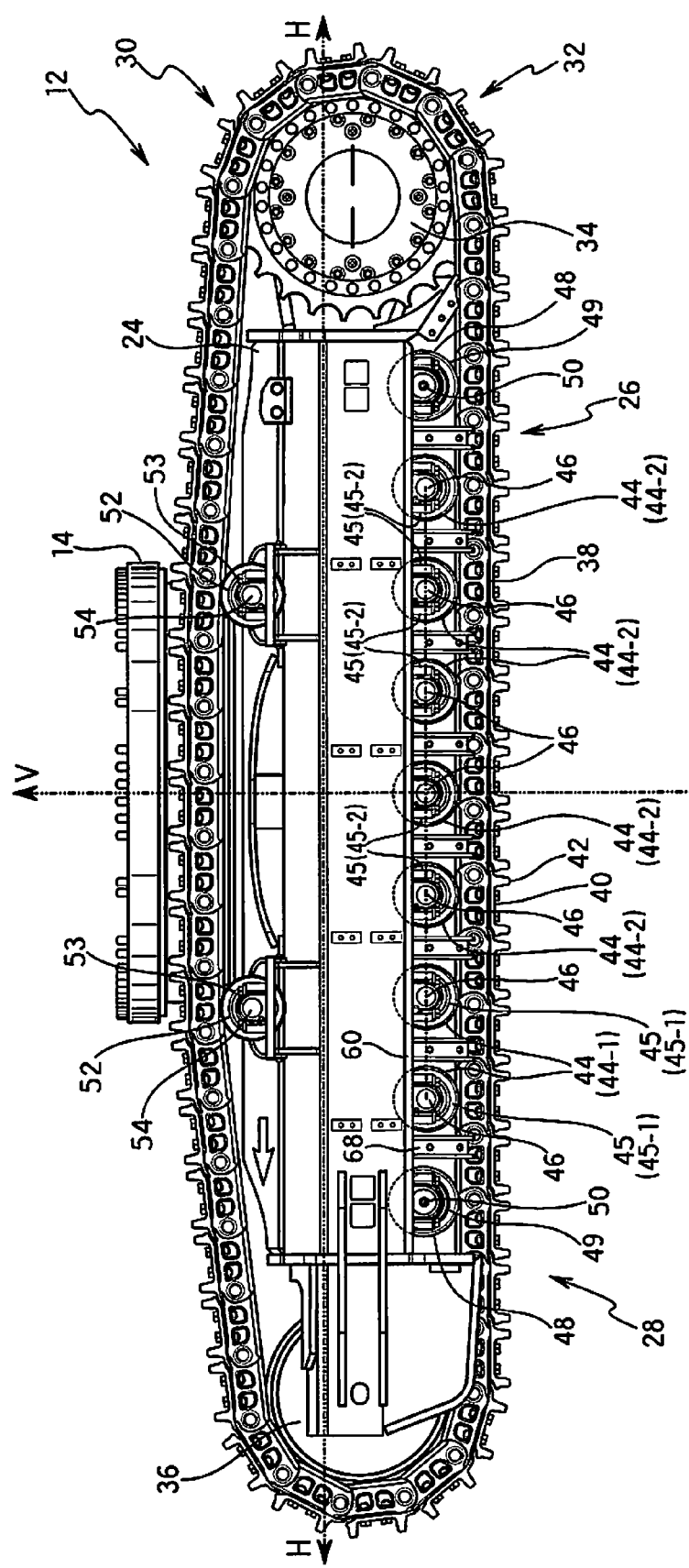
FIG. 2 is a left side elevational view of the traveling apparatus of the work vehicle illustrated in FIG. 1.
Figure 3:
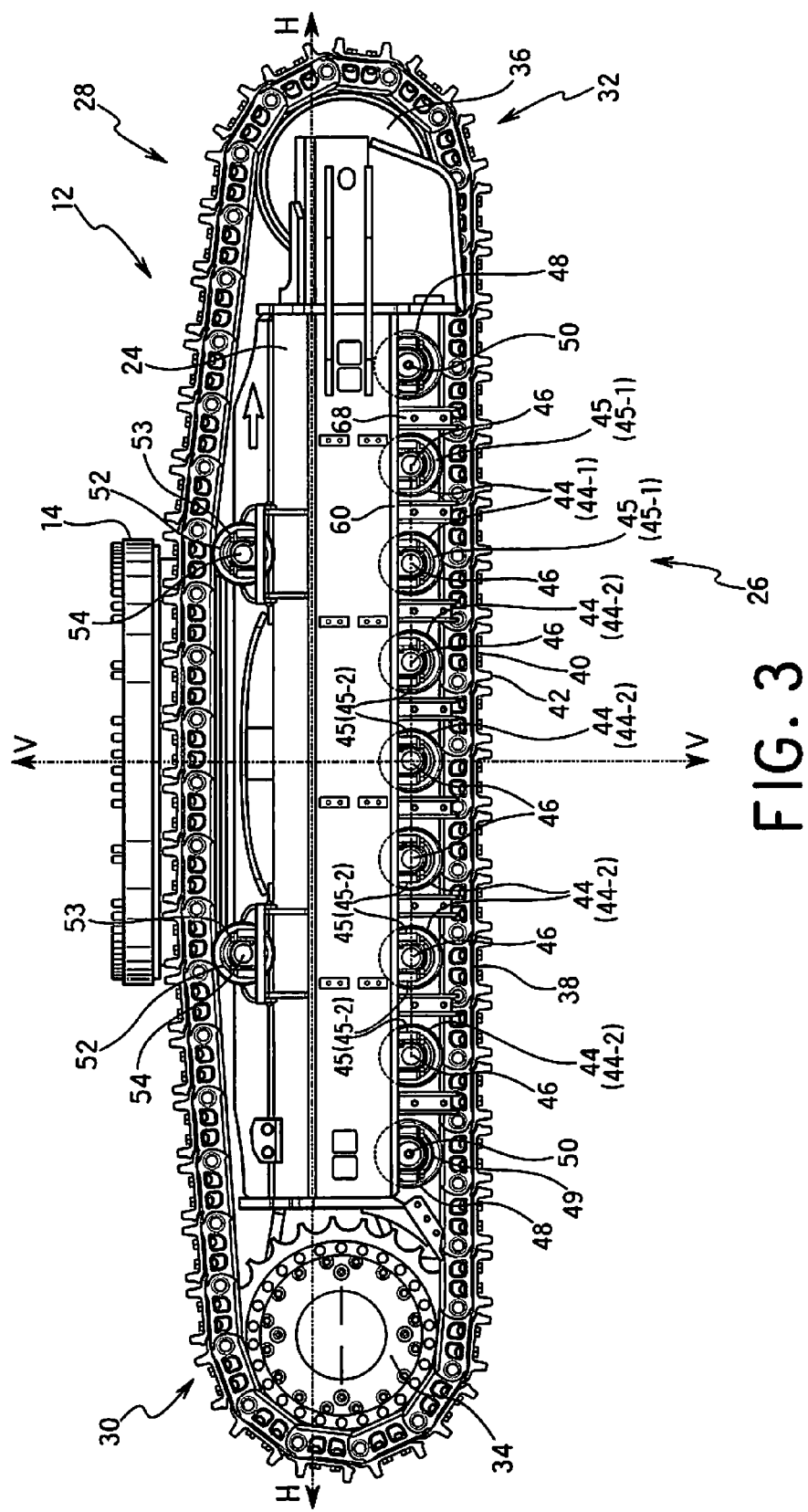
FIG. 3 is a right side elevational view of the traveling apparatus of the work vehicle illustrated in FIG. 1.
Figure 4:
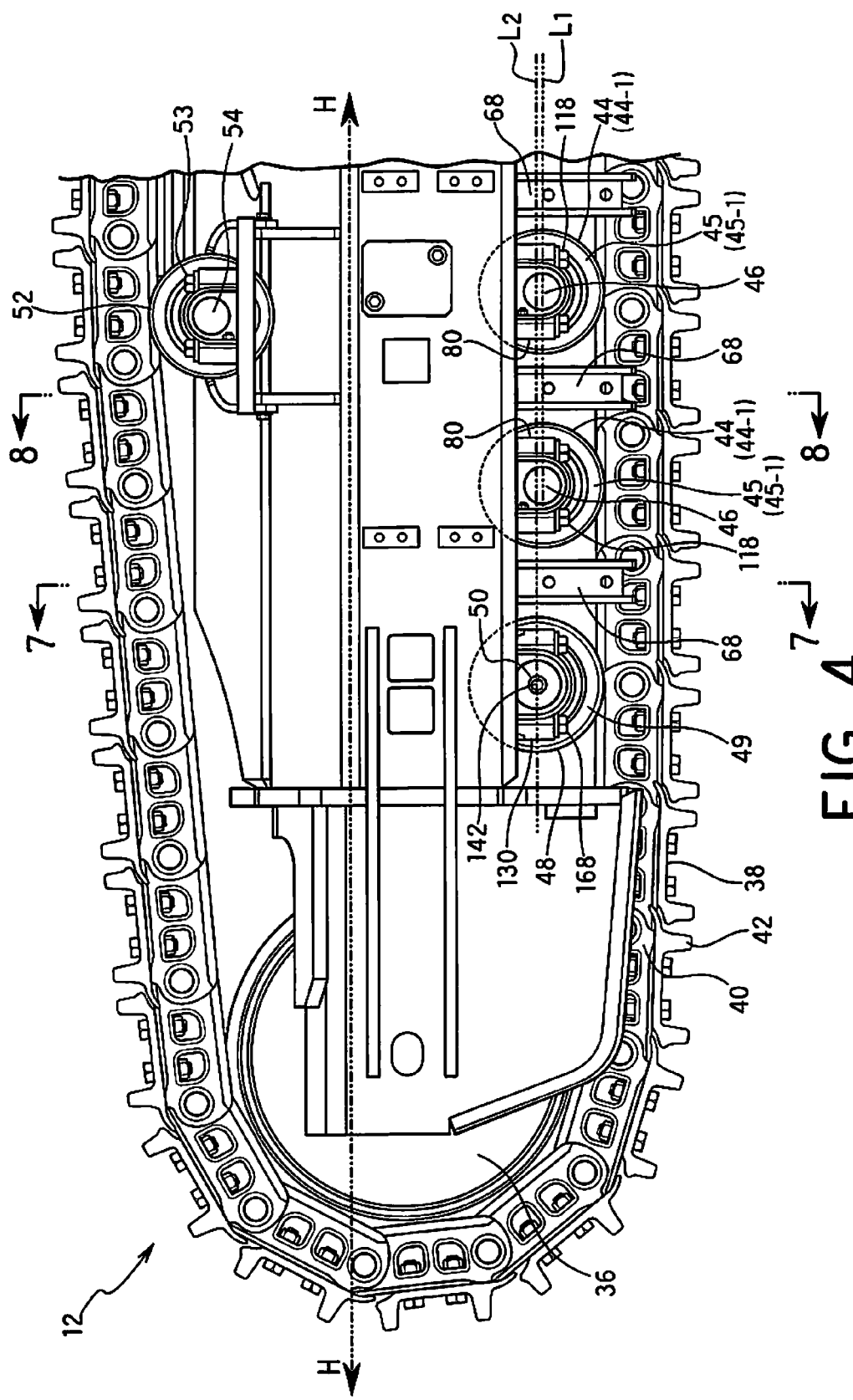
FIG. 4 is a partial left side elevational view of a front portion of the work vehicle traveling apparatus illustrated in FIGS. 1 and 2.
Figure 5:
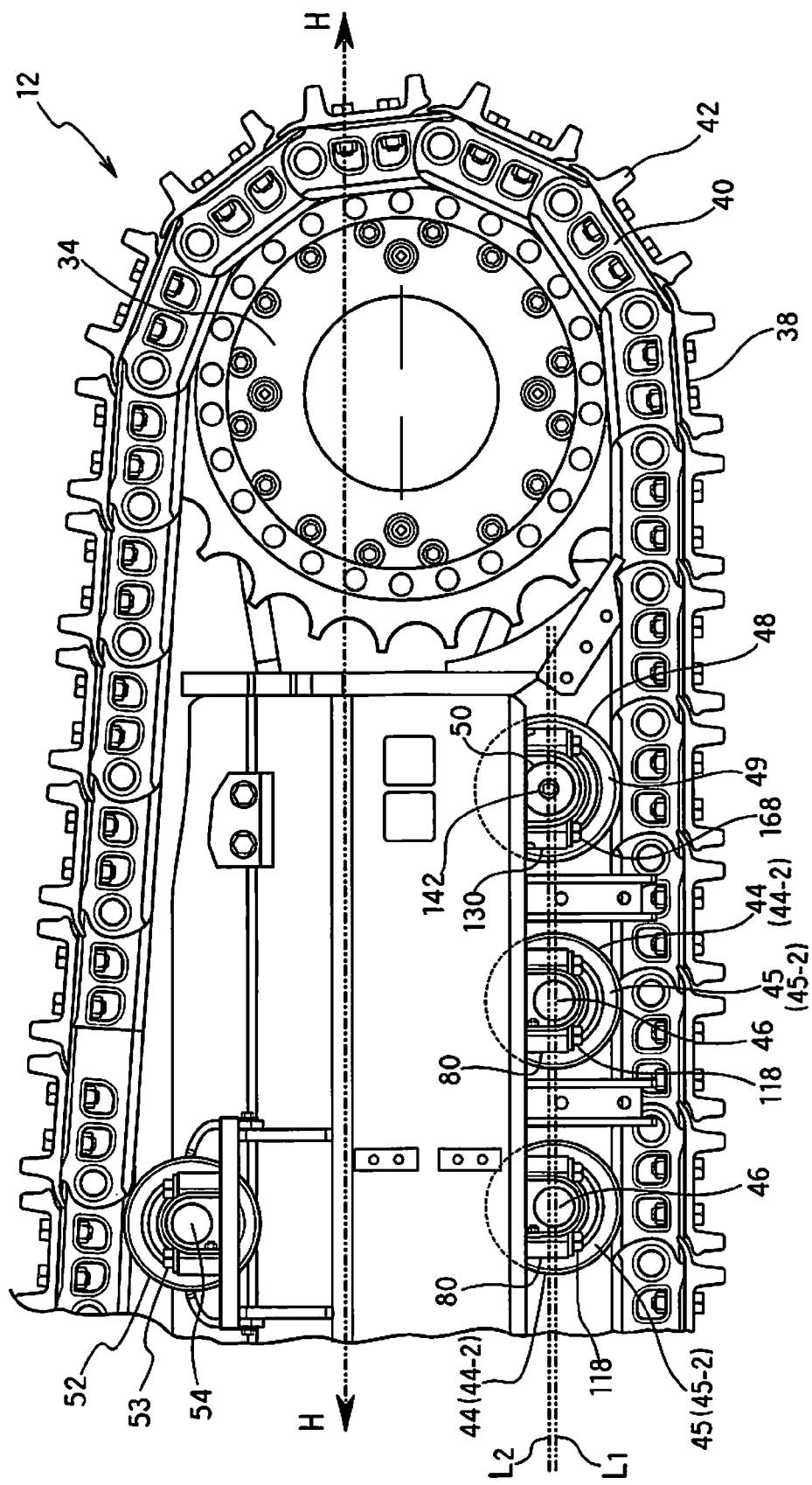
FIG. 5 is a partial left side elevational view of a rear portion of the work vehicle traveling apparatus illustrated in FIGS. 1 and 2.
Figure 6:
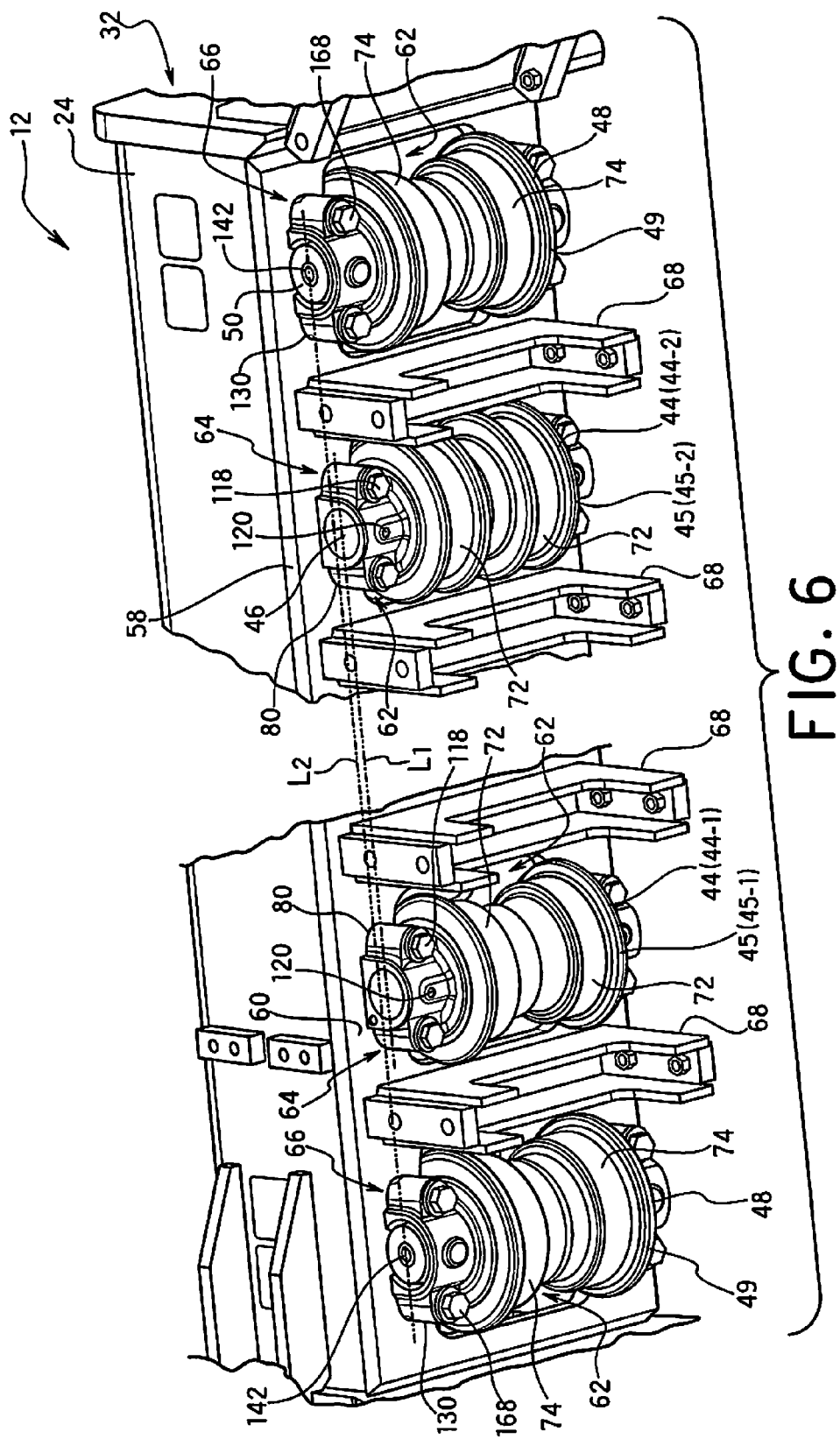
FIG. 6 is a partial underside perspective of the two frontmost track rollers and the two rearmost track rollers of the left track of the work vehicle traveling apparatus illustrated in FIG. 2.
Figure 8:
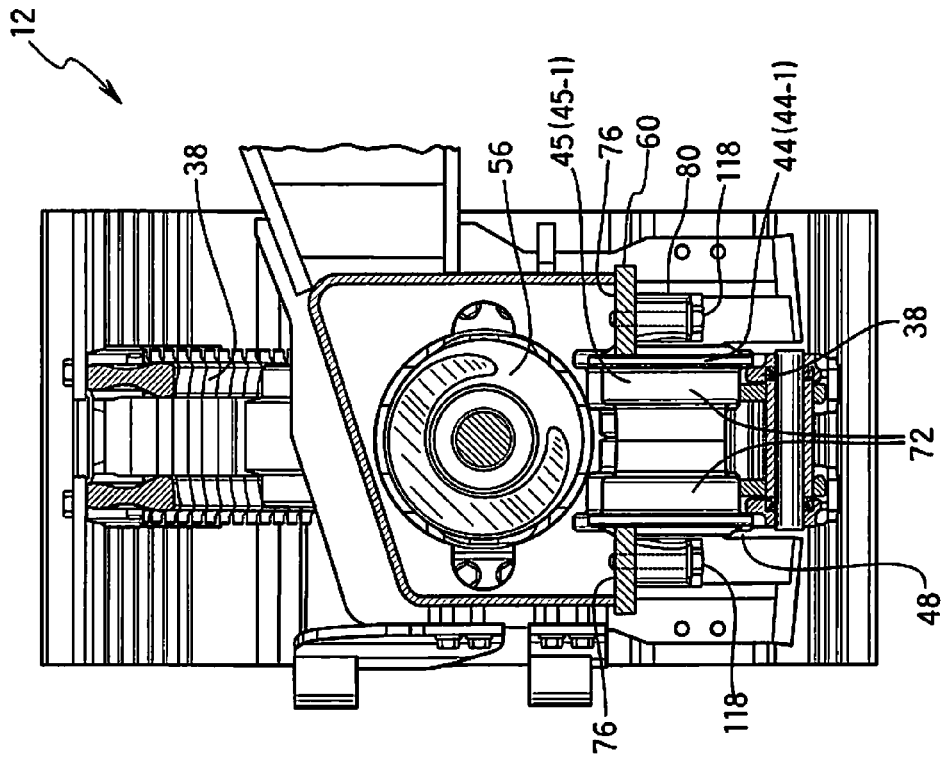
FIG. 8 is a cross sectional view of the left track of the work vehicle traveling apparatus as seen along section line 8-8 of FIG. 4.
Figure 7:
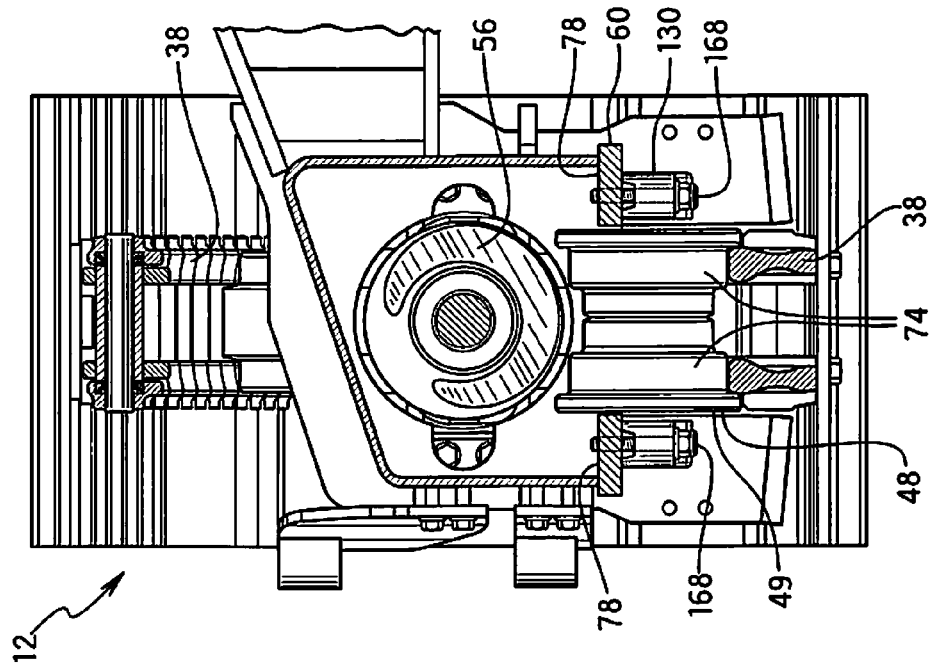
FIG. 7 is a cross sectional view of the left track of the work vehicle traveling apparatus as seen along section line 7-7 of FIG. 4.
Figure 9:
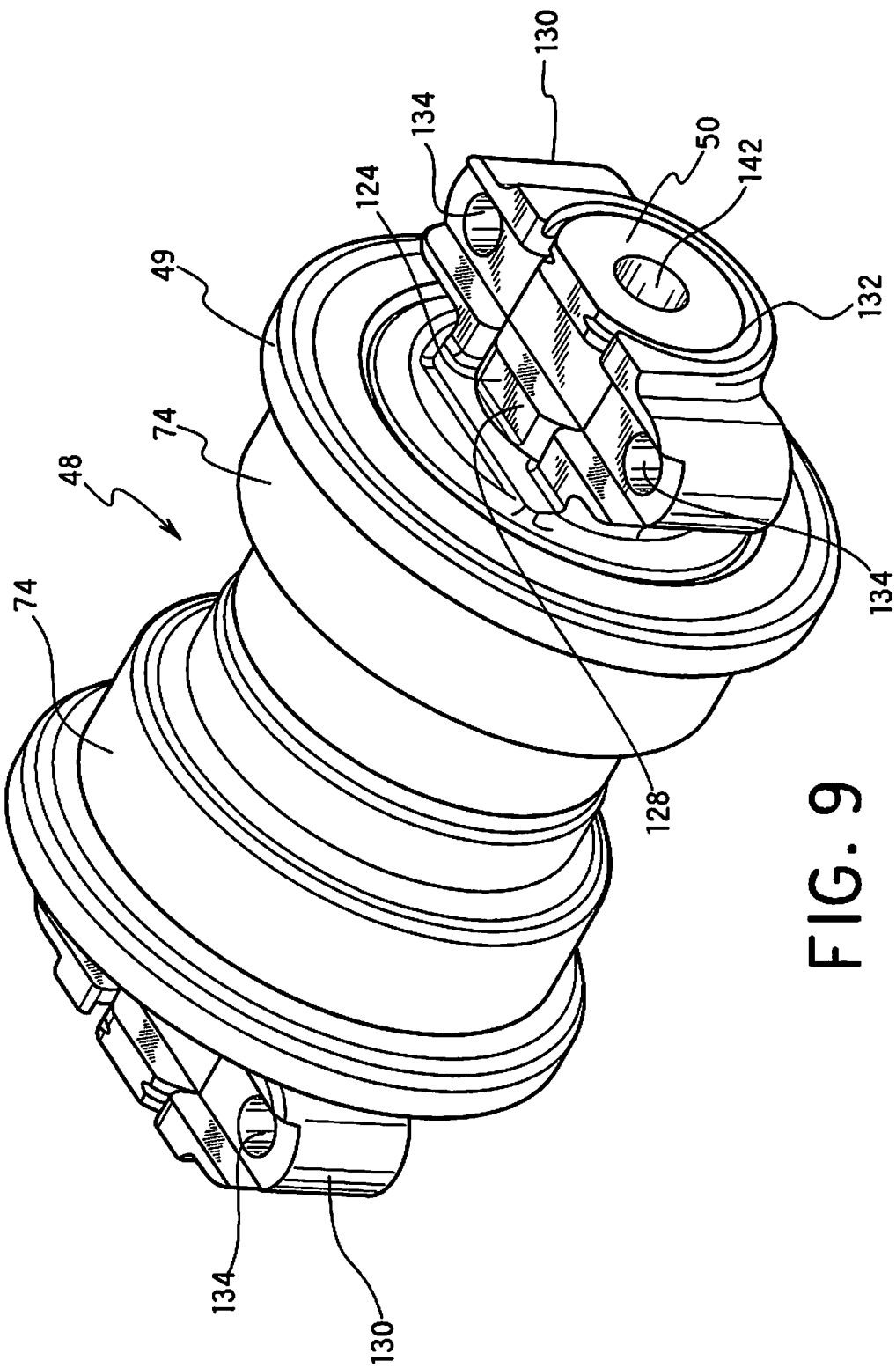
FIG. 9 is a perspective view of the frontmost track rollers of the work vehicle traveling apparatus illustrated in FIG. 2.
Figure 10:
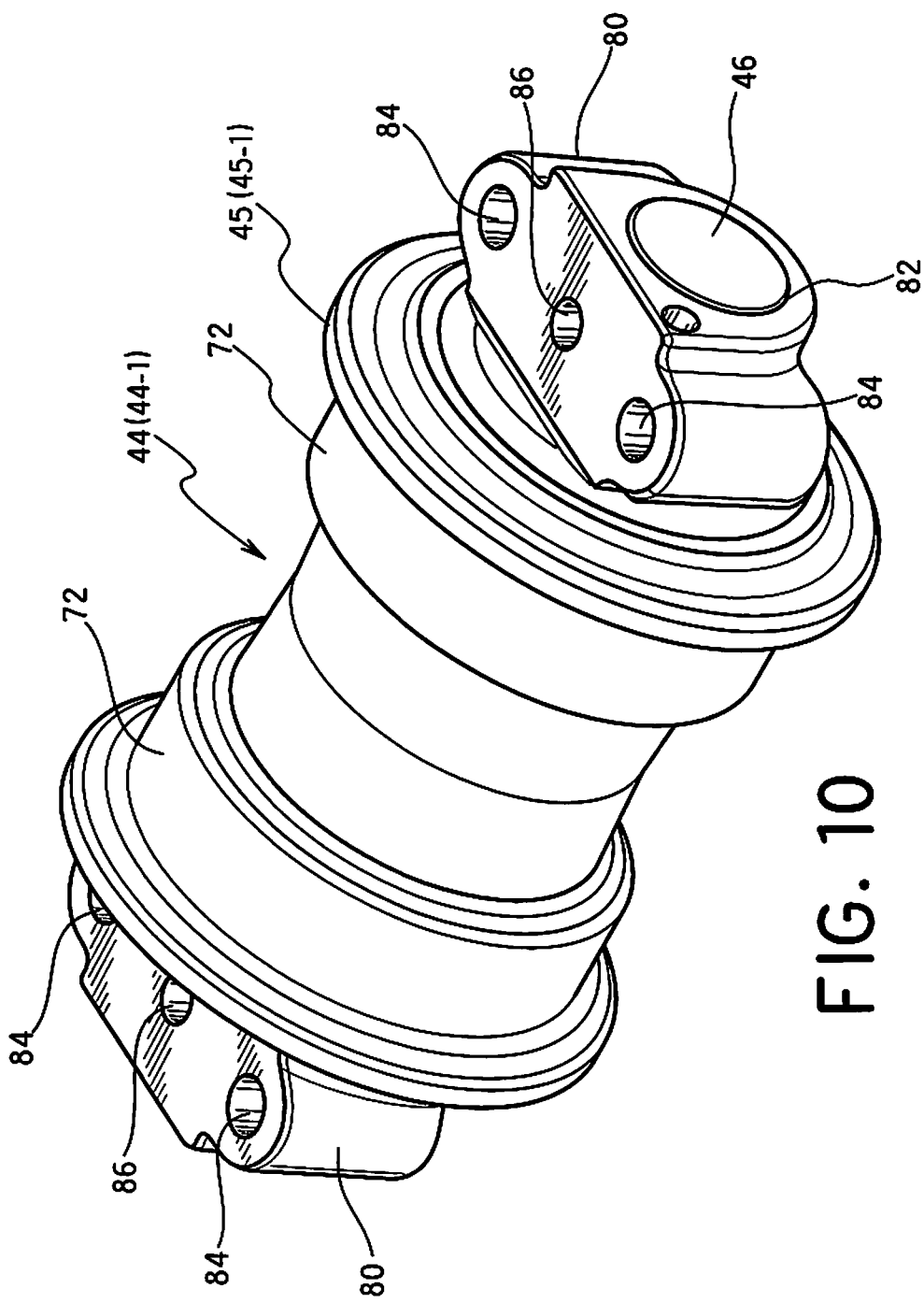
FIG. 10 is a perspective view of the second track rollers from the front end of the work vehicle traveling apparatus illustrated in FIG. 2.

As shown, for example, in FIGS. 2 through 5, the traveling apparatus 12 is configured as a track-type traveling apparatus as understood in the art. FIG. 2 is a left side elevational view of the traveling apparatus 12, and FIG. 3 is a right side elevational view of the traveling apparatus 12. The right and left sides of the traveling apparatus 12 are basically mirror images of each other. The features pertaining to the left side of the traveling apparatus 12 are discussed in detail below. The features of the right side of the traveling apparatus 12 are basically identical to those of the left side of the traveling apparatus and will not be discussed in further detail to avoid redundancy.

The traveling apparatus 12 includes a track frame 24 comprising a first end section 26, a second end section 28 opposite the first end section 26, an upper section 30 and a lower section 32 opposite the upper section 30. In this example, the first end section 26 and the second end section 28 are divided by a vertical border V that passes through the center of the track frame 24 in a direction of the height of the track frame 24. In this example, the direction of the vertical border V also represents the vertical direction V with respect to the track frame 24. Similarly, the upper section 30 and the lower section 32 are divided by a horizontal border H that passes longitudinally through the center of the track frame 24. In this example, the direction of the horizontal border H also represents the horizontal direction H with respect to the track frame 24.

A sprocket 34 is rotatably mounted to the first end section 26 of the track frame 24, and an idler 36 is rotatably mounted to the second end section 28 of the track frame 24 in any conventional manner as understood in the art. In this example, the first end section 26 can be considered a rear end section of the track frame 24, which is at the rear end of the traveling apparatus 12, and the second end section 28 can be considered a front end section of the track frame 24, which is at the front end of the traveling apparatus 12. As further understood in the art, the sprocket 34 is driven by a motor (not shown) in any conventional manner. Also, the sprocket 34 and the idler 36 are configured to movably support an endless track 38 that passes about the sprocket 34 and the idler 36 as understood in the art. The endless track 38 can be any conventional type of endless track 38 that includes endlessly-coupled track links 40 with track shoes 42 mounted on the track links 40. Thus, as can be appreciated from FIGS. 2 and 3, the traveling apparatus 12 includes two endless tracks 38 and their associated components discussed herein as appreciated in the art.

As further shown in FIGS. 2 through 8, the traveling apparatus 12 includes a plurality of small track rollers 44 that are each rotatably mounted to the lower section 32 of the track frame 24 between the sprocket 34 and the idler 36. That is, each small track roller 44 includes a small track roller shell 45 and a small track roller support shaft 46. For each small track roller 44, the small track roller shell 45 is rotatably mounted to the lower section 32 of the track frame 24 between the sprocket 34 and the idler 36 by the small track roller support shaft 46 that is fixedly mounted to the track frame 24 as discussed in more detail below. In particular, each small track roller shell 45, and thus each small track roller 44, is mounted by a respective small track roller support shaft 46 to be unmovable in vertical and horizontal directions with respect to the track frame 24. In this example, the traveling apparatus 12 includes seven small track rollers 44 on the left side of the traveling apparatus 12 and seven small track rollers 44 on the right side of the traveling apparatus 12 as shown in FIGS. 2 and 3. However, the traveling apparatus 12 can include any suitable number of small track rollers 44 as understood in the art.

The traveling apparatus 12 in this example further includes first and second large track rollers 48 that are each rotatably mounted to the lower section 32 of the track frame 24 between the sprocket 34 and the idler 36. That is, each large track roller 48 includes a large track roller shell 49 and a large track roller support shaft 50. For each large track roller 48, the large track roller shell 49 is rotatably mounted to the lower section 32 of the track frame 24 between the sprocket 34 and the idler 36 by the large track roller support shaft 50 that is fixedly mounted to the track frame 24 as discussed in more detail below. In particular, the large track roller shell 49 of each of the first and second large track rollers 48, and thus each of the first and second large track rollers 48, is mounted by a respective large track roller support shaft 50 to be unmovable in the vertical direction V and the horizontal direction H with respect to the track frame 24. Furthermore, as illustrated, all of the small track rollers 44 are disposed between the first and second large track rollers 48 on the left and right sides of the traveling apparatus 12. That is, one of the large track rollers 48 is positioned to be the frontmost roller in the sequence of rollers, and the other large track roller 48 is positioned to be the rearmost roller in the sequence of rollers as shown. For purposes of convention in this example, the first large track roller 48 is positioned closest to the sprocket 34 and the second large track roller 48 is positioned closest to the idler 36. Furthermore, although in this example the traveling apparatus 12 includes two large track rollers 48 on the left side of the traveling apparatus 12 and two large track rollers 48 on the right side of the traveling apparatus 12, the traveling apparatus 12 can include additional large track rollers 48 as desired.

The traveling apparatus 12 further includes a plurality of carrier rollers 52, which can be any type of conventional carrier rollers known in the art. In this example, the traveling apparatus 12 includes two carrier rollers 52 rotatably mounted to the left side of the traveling apparatus 12 and two carrier rollers 52 rotatably mounted to the right side of the traveling apparatus 12. In particular, each of the carrier rollers 52 includes a carrier roller shell 53 that is rotatably mounted to the upper section 30 of the track frame 24 by a respective carrier roller support shaft 54 in any conventional manner. Also, the traveling apparatus 12 can include any suitable number of carrier rollers 52.

In addition, the traveling apparatus 12 includes a spring assembly 56 that can be any conventional spring assembly. As understood in the art, the spring assembly 56 can be adjusted to move, for example, the idler 36 along the horizontal direction of the track frame 24 to adjust the tension of each of the endless tracks 38 about their respective sprocket 34, idler 36, small track rollers 44, large track rollers 48 and carrier rollers 52.

As shown in more detail in FIGS. 6 through 15, the traveling apparatus 12 includes mounting assemblies 58, one of which is shown. One mounting assembly 58 is mounted at the bottom of the lower section 32 of the track frame 24 on the left side of the traveling apparatus 12 to mount the small track rollers 44 and the large track rollers 48 on the left side of the traveling apparatus 12 to the lower section 32 of the track frame 24. The other mounting assembly 58 is mounted at the bottom of the lower section 32 of the track frame 24 on the right side of the traveling apparatus 12 to mount the small track rollers 44 and the large track rollers 48 on the right side of the traveling apparatus 12 to the lower section 32 of the track frame 24. Because these mounting assemblies 58 are essentially identical, only the mounting assembly 58 mounted to the left side of the traveling apparatus 12 to avoid redundancy.

In this example, the mounting assembly 58 include a ladder plate 60 that can be any suitable type of ladder plate 60 as known in the art. The ladder plate 60 is mounted to the lower section 32 of the track frame 24 in any conventional or otherwise suitable manner. The ladder plate 60 defines a plurality of openings 62 therein. Each of the openings 62 can receive and thus accommodate a portion of a small track roller 44 or a large track roller 48 as shown. The mounting assembly 58 also includes a plurality of first mounting assemblies 64 and a plurality of second mounting assemblies 66. As discussed in more detail below, each of the first mounting assemblies 64 is configured to mount a respective one the small track rollers 44 to the lower section 32 of the track frame 24, and each of the second mounting assemblies 66 is configured to mount a respective one of the large track rollers 48 to the lower section 32 of the track frame 24.

The mounting assembly 58 further includes a plurality of projection members 68 that are each connected to a surface of the ladder plate 60 between adjacent openings 62 in any conventional or otherwise suitable manner, and extend outward from the ladder plate 60. Thus, the projection members 68 extend in a downward direction with respect to the track frame 24. The traveling apparatus 12 includes a plurality of guards 70. As shown, for example, in FIG. 1, one guard 70 is removably mounted to the projection members 68 on the left side of the traveling apparatus 12, and the other guard 70 is mounted to the projection members 68 the right side of the traveling apparatus 12. The guards 70 can be removably mounted to the projection members 68 by bolts or any other suitable fastener to completely or at least partially cover the small track rollers 44 and the large track rollers 48 as shown, for example, in FIG. 1.

As further shown, each of the small track rollers 44 defines at least one respective small track rolling surface 72 having a respective first tread diameter D1, and each of the large track rollers 48 defines at least one respective large track rolling surface 74 having a respective second tread diameter D2 that is greater than the respective first tread diameter D1 of each of the small track rollers 44. Thus, the ratio of D1/D2 can be less than 1. In one example, the ratio of D1/D2 can be 0.9. However, the respective first and second tread diameters D1 and D2 can be any suitable dimensions as long as the second tread diameter D2 is larger than the first tread diameter D1.

In this example, the small track rollers 44 can have different configurations. That is, at least one of the small track rollers 44 can be a single flange small track roller 44-1 having a single flange small track roller shell 45-1, and at least one of the small track rollers 44 can be a double flange small track roller 44-2 having a double flange small track roller shell 45-2 as known in the art. In this example, the small track rollers 44 on the left side of the traveling apparatus 12 include two single flange small track rollers 44-1 and five double flange small track rollers 44-2. Likewise, the small track rollers 44 on the right side of the traveling apparatus 12 include two single flange small track rollers 44-1 and five double flange small track rollers 44-2. On each of the left and right sides of the traveling apparatus 12, a double flange small track roller 44-2 is positioned next to the large track roller 48 (e.g., the first large track roller 48) that is positioned next to the sprocket 34, and a single flange small track roller 44-1 is positioned next to the large track roller 48 (e.g., the second large track roller 48) that is positioned next to the idler 36. In particular, the arrangement of the sprocket 34, the idler 36, the small track rollers 44 and the large track rollers 48 on each of the left and right sides of the traveling apparatus 12 from the first end section 26 to the second end section 28 of the track frame 24 in this example is as follows: sprocket 34, one large track roller 48, five double flange small track rollers 44-2, two single flange small track rollers 44-1, one large track roller 48 and idler 36.

Further mounting details of the small track rollers 44 and the large track rollers 48 will now be described. As discussed above, the mounting assembly 58 including the first mounting assemblies 64 and the second mounting assemblies 66 fixedly secures the small track rollers 44 and the large track rollers 48 to the track frame 24. Each of the first mounting assemblies 64 includes a first mounting arrangement 76 configured to nonrotatably mount a respective small track roller support shaft 46 to the lower section 32 of the track frame 24. Also, each of the second mounting assemblies 66 includes a second mounting arrangement 78 configured to nonrotatably mount a respective large track roller support shaft 50 to the lower section 32 of the track frame 24. In this example, the first mounting arrangement 76 and the second mounting arrangement 78 can be configured as respective portions of the ladder plate 60 of the mounting assembly 58 that define the respective openings 62 in the ladder plate 60 as discussed above.

Each respective small track roller support shaft 46 in this example has a uniform diameter or a substantially uniform diameter. Each of the first mounting assemblies 64 further includes a first collar assembly 80 that is configured to entirely or at least substantially surround the small track roller support shaft 46 and mount the small track roller support shaft 46 to the first mounting arrangement 76. For example, as shown in detail in FIGS. 8, 10, 11 and 13, each first collar assembly 80 includes an opening 82 for receiving an end of a respective small track roller support shaft 46. Each first collar assembly further includes a plurality of openings 84 and at least one opening 86. Each first collar assembly 80 can also include a seal arrangement 88 that is disposed in a recess 90 defined in the first collar assembly 80. The seal arrangement 88 can be, for example, a Duo-Cone floating ring seal arrangement or any other type of conventional seal arrangement as understood in the art.

Each small track roller support shaft 46 includes an opening 92 at each of its ends. Also, each small track roller 44 can include two thrust bushings 94 that fit around the small track roller support shaft 46 as indicated. As understood in the art, the thrust bushings 94 are typically metallic thrust bushings that can be made of brass, bronze or any other suitable material. Each thrust bushing 94 includes a cylindrical portion 96 and an annular flange portion 98 that extends radially from an outbound end of the cylindrical portion 96 about the entire outbound end of the cylindrical portion 96 as understood in the art. As indicated, the annular flange portion 98 has an inner diameter SID and an outer diameter SOD. The cylindrical portion 96 of the thrust bushing 94 fits around the small track roller support shaft 46 and the annular flange portion 98 abuts against a first collar assembly 80. The cylindrical portion 96 of the thrust bushing 94 includes cylindrical surfaces 100 and 102, and the annular flange portion 98 of the thrust bushing 94 includes annular flange surfaces 104 and 106. Cylindrical surface 100 contacts an inner diameter surface 108 of the small track roller shell 45, and cylindrical surface 102 contacts an outer diameter surface 110 of the small track roller shaft 46. Annular flange surface 104 contacts and edge surface 112 of the small track roller shell 45, and annular flange surface 106 contacts an edge surface 114 of the first collar assembly 80 when the first collar assembly 80 is mounted at an end of the small track roller support shaft 46 as shown. Thus, the cylindrical surfaces 100 and 102, and the annular flange surfaces 104 and 106, enhance rotation of the small track roller shell 45 about the small track roller support shaft 46 as understood in the art.

As indicated, a respective first collar assembly 80 is mounted at each end of a respective small track roller support shaft 46 so that an end of the small track roller support shaft 46 is received into the opening 82 of the first collar assembly 80. As understood in the art, the seal arrangement 88 can prevent moisture and debris from entering between the cylindrical surface 100 of the thrust bushing 94 and the inner diameter surface 108 of the small track roller shell 45, between the cylindrical surface 102 of the thrust bushing 94 and the outer diameter surface 110 of the small track roller shaft 46, between the annular flange surface 104 and the edge surface 112 of the small track roller shaft 46, and between the annular flange surface 106 and the edge surface 114 of the first collar assembly 80.

Furthermore, each first mounting arrangement 76 includes a plurality of openings 116 positioned on opposite sides of opening 62. The first collar assemblies 80 are positioned with respect to the first mounting arrangement 76 so that the openings 84 align with respective openings 116 in the first mounting arrangements 76. Fastening devices 118, such as bolts, rivets or any other suitable type of fastening device, are received into the openings 84 and 116 to removably secure the small track roller support shaft 46, and thus the small track roller 44, to the ladder plate 60 of the mounting assembly 58.

Therefore, a respective pair of first collar assemblies 80 mounts each respective small track roller 44 to the mounting assembly 58, and thus mounts each respective small track roller 44 to the track frame 24. In addition, another fastening device 120, such as a bolt, rivet, screw, or any other suitable type of fastening device, is received into opening 86 in first collar assembly 80 and a respective opening 92 at one end of the small track roller support shaft 46. This fastening device 120 prevents the small track roller support shaft 46 from rotating with respect to the first collar assembly 80. Accordingly, the pair of fastening devices 120 prevents the small track roller support shaft 46 from rotating with respect to its pair of first collar assemblies 80.

Figure 11:
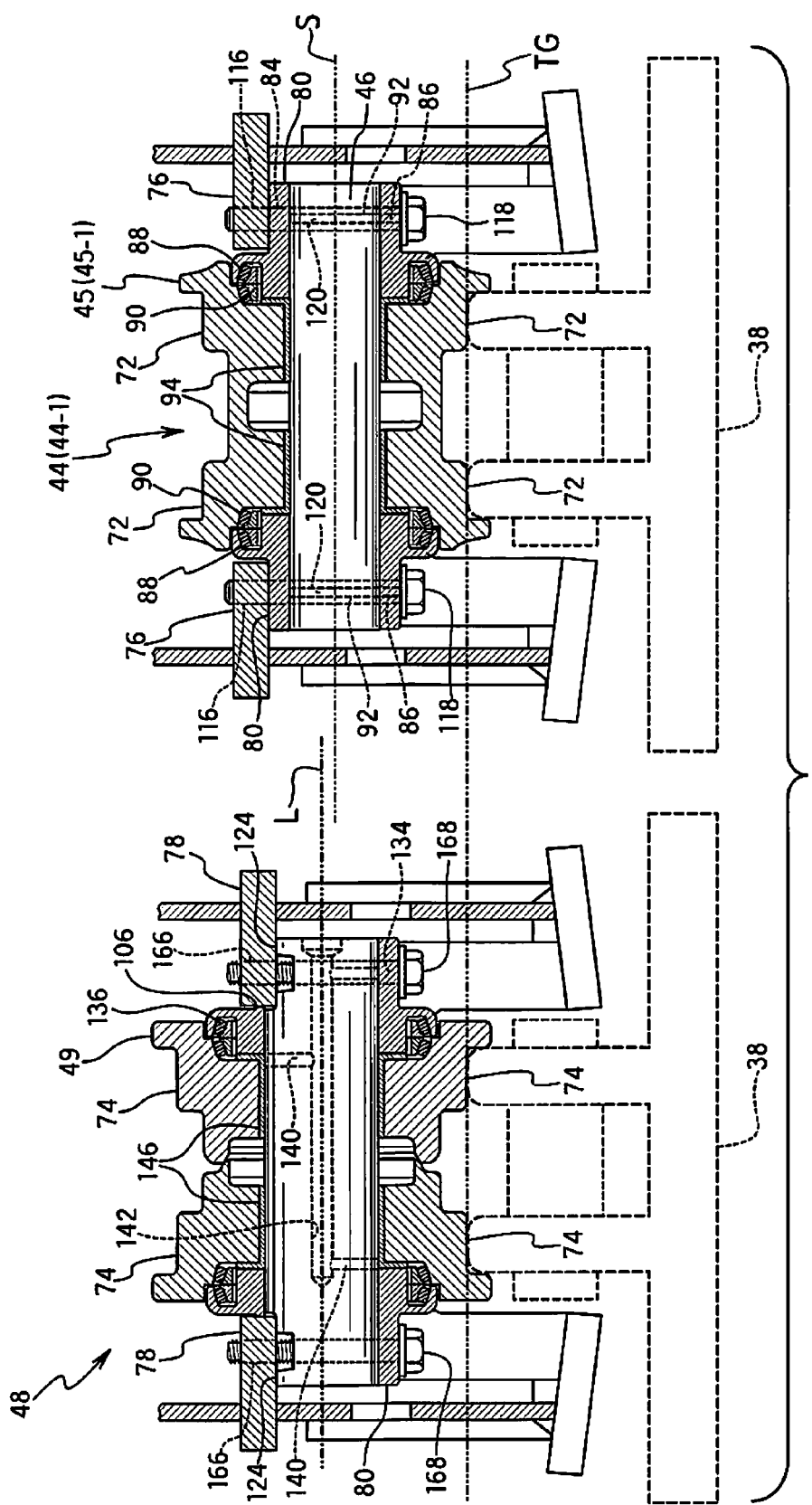
FIG. 11 is a pair of cross sectional views, arranged side-by-side of the two frontmost track rollers of the left track of the work vehicle traveling apparatus illustrated in FIG. 2 as seen along a vertical diameter section line.

As can be appreciated, in particular, from FIGS. 11 and 12, each respective large track roller support shaft 50 in this example has a large diameter portion 122, and a modified diameter portion 124 at each end of the large track roller support shaft 50. The large diameter portion 122 and the modified diameter portion 124 form a recessed area 126 that is configured to accommodate a portion of the second mounting arrangement 78 while the large track roller support shaft 50 is mounted to the second mounting arrangement 78 as discussed in detail below. The modified diameter portion 124 further includes a flat surface 128 which is described in more detail below.

Each of the second mounting assemblies 66 further includes a second collar assembly 130 that is configured to partially surround the large track roller support shaft 50 and mount the large track roller support shaft 50 to the second mounting arrangement 78. For example, as shown in detail in FIGS. 7, 9, 11 and 12, each second collar assembly 130 includes an opening 132 for receiving an end of a respective large track roller support shaft 50. Each second collar assembly 130 further includes a plurality of openings 134 on one side of the second collar assembly 130. Each second collar assembly 130 can also include a seal arrangement 136 that is similar to the seal arrangement 88 discussed above and disposed in a recess 138 defined in the second collar assembly 130.

Each large track roller support shaft 50 in this example further includes radially extending openings 140 that extend in a radial direction of the large track roller support shaft 50, and an axial opening 142 that extends axially along at least a portion of the large track roller support shaft 50. As understood in the art, radially extending openings 140 communicate with the axial opening 142 and therefore, the radially extending openings 140 and the axial opening 142 can function as lubricant passages to provide lubricant to the large track roller support shaft 50 in any conventional manner. Also, although in this example the small track roller support shafts 46 are not show as having lubricant passages, the small track roller support shafts 46 can also include such lubricant passages as understood in the art.

In addition, as with the small track rollers 44, each large track roller 48 can include two thrust bushings 144 that fit around the large track roller support shaft 50 as indicated. As with the thrust bushings 94 discussed above, the thrust bushings 144 are typically metallic thrust bushings that can be made of brass, bronze or any other suitable material. Each thrust bushing 144 includes a cylindrical portion 146 and an annular flange portion 148 that extends radially from an outbound end of the cylindrical portion 146 about the entire outbound end of the cylindrical portion 146 as understood in the art. As indicated, the annular flange portion 148 has an inner diameter LID and an outer diameter LOD. The cylindrical portion 146 of the thrust bushing 144 fits around the large track roller support shaft 50 and the annular flange portion 148 abuts against a second collar assembly 130. The cylindrical portion 146 of the thrust bushing 144 includes cylindrical surfaces 150 and 152, and the annular flange portion 148 of the thrust bushing 144 includes annular flange surfaces 154 and 156. Cylindrical surface 150 contacts an inner diameter surface 158 of the large track roller shell 49, and cylindrical surface 152 contacts an outer diameter surface 160 of the large track roller shaft 50. Annular flange surface 154 contacts edge surface 162 of the large track roller shell 49, and annular flange surface 156 contacts an edge surface 164 of the second collar assembly 130 when the second collar assembly 130 is mounted at an end of the large track roller support shaft 50 as shown. Thus, the cylindrical surfaces 150 and 152, and the annular flange surfaces 154 and 156, enhance rotation of the large track roller shell 49 about the large track roller support shaft 50 as understood in the art.

As can be appreciated from the above, the dimensions of the inner diameter LID and the outer diameter LOD of the annular flange portion 148 are proportionally greater than the inner diameter SID and an outer diameter SOD of the annular flange portion 98. Therefore, the respective surface areas of each of the annular flange surfaces 154 and 156 of the annular flange portion 148 are proportionally greater than the respective surface areas of each of the annular flange surfaces 104 and 106. For instance, a ratio of a respective surface area of one of the annular flange surfaces 154 or 156 to a respective surface area of one of the annular flange surfaces 104 or 106 can be about 1.5. Thus, the respective surface area of each of the annular flange surfaces 154 and 156 can be about 50% greater than the respective surface area of each of the annular flange surfaces 104 and 106. Naturally, the ratio of surface areas can be any suitable value as deemed appropriate. This additional surface area of each of the annular flange surfaces 154 and 156 can reduce the contact pressure between the annular flange surface 154 and the edge surface 162 of the large track roller shaft 50, and the contact pressure between the annular flange surface 156 and the edge surface 164 of the second collar assembly 130, by at or about 32% of the respective contact pressure between the annular flange surface 104 and the edge surface 112 of the small track roller shaft 46, and the respective contact pressure between the annular flange surface 106 and the edge surface 114 of the first collar assembly 80. This reduction in pressure can increase the wear life of the thrust bushing 144 by at or about 2.2 times in comparison to an arrangement in which a smaller thrust bushing 94 is used with the large track roller shell 49. For example, the use of the larger thrust bushing 144 with the large track roller shell 49 can increase the wear life of the thrust bushing 144 to at least 7000 hours.

As further indicated, a respective second collar assembly 130 is mounted at each end of a respective large track roller support shaft 50 so that an end of the large track roller support shaft 50 is received into the opening 132 of the second collar assembly 130. As understood in the art, the seal arrangement 136 can prevent moisture and debris from entering between the cylindrical surface 150 of the thrust bushing 144 and the inner diameter surface 158 of the large track roller shell 49, between the cylindrical surface 152 of the thrust bushing 144 and the outer diameter surface 160 of the large track roller shaft 50, between the annular flange surface 154 and the edge surface 162 of the large track roller shell 49, and between the annular flange surface 156 and the edge surface 164 of the second collar assembly 130.

Furthermore, each second mounting arrangement 78 includes a plurality of openings 166 positioned on opposite sides of opening 62. The second collar assemblies 130 are positioned with respect to the second mounting arrangement 78 so that the openings 134 align with respective openings 166 in the second mounting arrangements 78. Fastening devices 168, such as bolts, rivets or any other suitable type of fastening device, are received into the openings 134,166 to removably secure the large track roller support shaft 50, and thus the large track roller 48, to the ladder plate 60 of the mounting assembly 58.

Therefore, a respective pair of second collar assemblies 130 mounts each respective large track roller 48 to the mounting assembly 58, and thus mounts each respective large track roller 48 to the track frame 24. Also, the flat surface 128 of the modified diameter portion 124 at each end of the large track roller support shaft 50 contacts a respective second mounting arrangement 78 to prevent the large track roller support shaft 50 from rotating with respect to the second collar assembly 130.

As shown in further detail in FIG. 11, the first and second mounting assemblies 64 and 66 mount the small track rollers 44 and large track rollers 48 to the track frame 24 such that a respective longitudinal central axis S of each respective small track roller support shaft 46 is vertically offset from a respective longitudinal central axis L of each respective large track roller support shaft 50 in a direction extending between the upper section 30 and the lower section 32. In particular, each respective small track roller support shaft 46 is mounted closer to the bottom of the track frame 24 and each large track roller support shaft 50 is mounted closer to the upper section of the track frame 24 than any small track roller support shaft 46. Furthermore, the longitudinal central axes S of the small track roller support shafts 46 are aligned along a first track frame longitudinal direction L1 that extends longitudinally between the first end section 26 and the second end section 28. Similarly, the longitudinal central axes L of the large track roller support shafts 50 are aligned along a second track frame longitudinal direction L2 that extends longitudinally between the first end section 26 and the second end section 28. The first track frame longitudinal direction L1 and the second track frame longitudinal direction L2 are parallel to each other and to the horizontal direction H with respect to the track frame 24.

This alignment of the first track frame longitudinal direction L1 and the second track frame longitudinal direction L2 arrange the small track rolling surface 72 of each small track roller 44 and the large track rolling surface 74 of each large track roller 48 to be aligned or substantially aligned along a track guide line TG that extends tangentially to each small track rolling surface 72 and each large track rolling surface 74. Therefore, the small track rollers 44 and the large track rollers 48 guide the endless track 38 along the track guide line TG. In particular, the small track rollers 44 and the large track rollers 48 are rotatably drivable by the sprocket 34 via the endless track 38 while guiding the endless track 38 along the track guide line TG. The pair of endless tracks 38 can therefore propel and maneuver the work vehicle 10 in a conventional manner. Moreover, the increased diameter D2 of the frontmost and rearmost track rollers, which are the large track rollers 48, improve wear and durability of the frontmost and rearmost track rollers.

While only selected embodiments have been chosen to illustrate the present invention, it will be apparent to those skilled in the work vehicle field from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A work vehicle comprising:
    a vehicle body;
    a work implement;
    a track frame comprising a first end section, a second end section opposite the first end section, an upper section and a lower section opposite the upper section;
    a sprocket rotatably mounted to the first end section of the track frame;
    an idler rotatably mounted to the second end section of the track frame, the sprocket and the idler being configured to movably support an endless track that passes about the sprocket and the idler;
    a plurality of small track rollers configured to guide the endless track, each including a respective small track roller shell rotatably mounted to the lower section of the track frame between the sprocket and the idler by a respective small track roller support shaft that is fixedly mounted to the track frame, such that the small track rollers are unmovable in vertical and horizontal directions with respect to the track frame; and
    first and second large track rollers configured to guide the endless track, each including a respective large track roller shell rotatably mounted to the lower section of the track frame between the sprocket and the idler by a respective large track roller support shaft that is fixedly mounted to the track frame, such that the first and second large track rollers are unmovable in the vertical and horizontal directions with respect to the track frame with all of the small track rollers being disposed between the first and second large track rollers, each of the small track rollers defining a respective small track rolling surface having a respective first tread diameter and each of the large track rollers defining a respective large track rolling surface having a respective second tread diameter that is greater than the respective first tread diameter of each of the small track rollers, and each of the small track rolling surfaces and each of the large track rolling surfaces are substantially aligned along a track guide line that extends tangentially to each of the small track rolling surfaces and each of the large track rolling surfaces such that the small and large track rollers are configured to guide the endless track along the track guide line.

2. The work vehicle according to claim 1, wherein
    a respective longitudinal central axis of each of the respective small track roller support shafts is vertically offset from a respective longitudinal central axis of each of the respective large track roller support shafts in a direction extending between the upper and lower sections.

3. The work vehicle according to claim 2, wherein
    each of the large track roller support shafts is mounted closer to the upper section than any of the small track roller support shafts.

4. The work vehicle according to claim 1, wherein
    each of the respective small track roller support shafts has a respective longitudinal central axis aligned along a first track frame longitudinal direction that extends longitudinally between the first and second end sections.

5. The work vehicle according to claim 1, wherein
    each of the respective large track roller support shafts has a respective longitudinal central axis aligned along a second track frame longitudinal direction that extends longitudinally between the first and second end sections.

6. The work vehicle according to claim 1, wherein
    the small and large track rollers are rotatably drivable by the sprocket via the endless track while guiding the endless track along the track guide line.

7. The work vehicle according to claim 1, wherein
    each of the small track rollers includes a pair of small thrust bushings mounted over the respective small track roller support shaft between the respective small track roller support shaft and the respective small track roller shell, each of the small thrust bushings including a small annular flange having a small annular flange surface that contacts a respective end of the respective small track roller shell, the small annular flange surface having a first surface area; and
    each of the large track rollers includes a pair of large thrust bushings mounted over the respective large track roller support shaft between the respective large track roller support shaft and the respective large track roller shell, each of the large thrust bushings including a large annular flange having a large annular flange surface that contacts a respective end of the respective large track roller shell, the large annular flange surface having a second surface area greater than the first surface area.

8. The work vehicle according to claim 1, wherein
    the plurality of small track rollers includes at least one single flange small track roller and at least one double flange small track roller.

9. The work vehicle according to claim 8, wherein
    the double flange small track roller is positioned next to the first large track roller and the single flange small track roller is positioned next to the second large track roller.

10. The work vehicle according to claim 9, wherein
    the first large track roller is positioned closest to the sprocket and the second large track roller is positioned closest to the idler.

11. The work vehicle according to claim 1, further comprising
    a mounting assembly configured to mount the small track rollers and the large track rollers to the lower section of the track frame.

12. The work vehicle according to claim 11, wherein
    the mounting assembly includes a plurality of first mounting assemblies and a plurality of second mounting assemblies, each of the first mounting assemblies being configured to mount a respective one of the small track rollers to the lower section of the track frame and each of the second mounting assemblies being configured to mount a respective one of the large track rollers to the lower section of the track frame.

13. The work vehicle according to claim 12, wherein
each of the first mounting assemblies includes a first mounting arrangement configured to nonrotatably mount a respective small track roller support shaft to the lower section of the track frame; and
each of the second mounting assemblies includes a second mounting arrangement configured to nonrotatably mount a respective large track roller support shaft to the lower section of the track frame.

14. The work vehicle according to claim 13, wherein
each of the respective small track roller support shafts has a uniform diameter.

15. The work vehicle according to claim 14, wherein
each of the first mounting assemblies further includes a first collar assembly that is configured to surround the small track roller support shaft and mount the small track roller support shaft to the first mounting arrangement.

16. The work vehicle according to claim 13, wherein
each of the respective large track roller support shafts has a large diameter portion having a large diameter and a modified diameter portion, the large and modified diameter portions forming a recessed area configured to accommodate a portion of the second mounting arrangement while the large track roller support shaft is mounted to the second mounting arrangement.

17. The work vehicle according to claim 16, wherein
each of the second mounting assemblies further includes a second collar assembly that is configured to partially surround the large track roller support shaft and mount the large track roller support shaft to the second mounting arrangement.

18. A work vehicle according to claim 1, further comprising
another sprocket, another idler, another plurality of small track rollers and another set of first and second large track rollers, such that the sprocket, the idler, the plurality of small track rollers and the first and second large track rollers are mounted to a first side of the track frame, and the another sprocket, the another idler, the another plurality of small track rollers and the another set of first and second large track rollers are mounted to a second side of the track frame opposite the first side.

* * * * *